United States Patent [19]

Häberle et al.

[11] 3,876,244

[45] Apr. 8, 1975

[54] BUMPER FOR MOTOR VEHICLES

[75] Inventors: Fritz Häberle; Daniel Riechers, both of Sindelfingen, Germany

[73] Assignee: Daimler-Benz Aktiengesellschaft, Stuttgart, Germany

[22] Filed: Dec. 21, 1972

[21] Appl. No.: 317,304

[30] Foreign Application Priority Data

Dec. 21, 1971 Germany............................ 2163445
Apr. 11, 1972 Germany............................ 2217324

[52] U.S. Cl................ 293/88; 293/71 R; 267/140
[51] Int. Cl............................................. B60r 19/06
[58] Field of Search ........ 248/22; 293/71 R, 85, 86, 293/88, 98; 267/57.1 A, 140, 141, 153

[56] References Cited
UNITED STATES PATENTS

| | | | |
|---|---|---|---|
| 2,582,426 | 1/1952 | Greene | 267/57.1 A |
| 2,788,998 | 4/1957 | Wilfert | 293/88 |
| 3,263,954 | 8/1966 | Baratoff | 267/141 |
| 3,656,792 | 4/1972 | Tavano, Sr. | 293/88 |

FOREIGN PATENTS OR APPLICATIONS 933,252  4/1948  France................................ 248/22

*Primary Examiner*—M. Henson Wood, Jr.
*Assistant Examiner*—Robert Saifer
*Attorney, Agent, or Firm*—Craig & Antonelli

[57] ABSTRACT

A bumper for motor vehicles which is connected with the support structure under interposition of elastomer-metal elements in a series connection there are shock absorbers, on the one hand, and elastomer blocks supporting the shock absorbers in the vehicle transverse direction as well as elastomer inserts receiving an end of the shock absorbers within the area of the forward end face of the bumper are provided between the bumper and the support structure; the connection of the shaft of each shock absorber with the associated elastomer blocks may also take place by interposition of a rigidly secured intermediate member which is of shell-like construction and is anchored in the elastomer blocks by two substantially vertically extending, mutually opposite extensions.

60 Claims, 9 Drawing Figures

BUMPER FOR MOTOR VEHICLES

The present invention relates to a bumper for motor vehicles, especially passenger motor vehicles, which is connected with the support structure by interconnection of elastomer-metal elements.

A possibility is already described in the U.S. Pat. No. 1,810,717 to elastically support a bumper in the vehicle longitudinal direction by means of rubber-metal elements so that slight impacts and vibration appearances are not transmitted to the remaining vehicle. This prior art construction entails the disadvantage that laterally impinging shocks or impacts and especially stronger impacts in the vehicle longitudinal direction cannot be absorbed without damaging the bumper mounting or supporting parts of the body.

It is the aim of the present invention to provide a bumper which does not entail the indicated disadvantages and which in particular includes transmission and fastening elements that permit a subsequent change-over by simple means.

Accordingly, a bumper for motor vehicles, especially for passenger motor vehicles, is proposed which is connected with the support structure by interposition of elastomer-metal elements, whereby according to the present invention of a series pipe connection is provided between on the one hand, shock absorbers, and, on the other, elastomer blocks supporting the shock absorber in the vehicle transverse direction as well as elastomer inserts receiving an end of the shock absorbers within the area of the front side of the bumper.

A particularly favorable force introduction takes place if two shock absorbers are provided which are each disposed in a horizontal plane and extend with respect to one another at an acute angle in the direction of the bumper and are connected with each other by an elastomer block.

A structural unit simple to install can be achieved if the outwardly directed elastomer blocks are surrounded by a frame with a bottom and are inserted into a pocket and if an aperture is provided in the bottom through which the stem or shaft of the shock absorber or shock absorbers can be extended so as to be pivotal in the vehicle transverse direction.

In one embodiment of the present invention, the elastomer insert can be surrounded by a pocket of rectangular or oval cross section which is inserted from the front side of the bumper into the same and is rigidly connected with the bumper, for example, by welding, whereby the free end of the shock absorber-shaft or stem can be retained by a bayonet-connection-like arrangement. A towing of the vehicle is thereby possible by the fastening of the tow equipment at the bumper.

It is furthermore appropriate if the elastomer blocks are connected with each other by a one-piece or by a multi-partite metal member, and if the elastomer blocks are surrounded externally by a respective metal plate which is detachably connected with the bumper, preferably under production of a prestress force produced by the elastomer blocks.

According to a further feature of the present invention the shaft or stem of each shock absorber may include two collars against which are supported the associated elastomer blocks and the elastomer insert.

With a bumper having only one bar or rail member, the pocket may be inserted from the backside of the bumper into a correspondingly large aperture provided therein and can be rigidly connected with the walls of the bumper disposed nearest thereto, for example, by welding.

It is thereby of advantage if the front side of the bumper is provided with a rubber strip which extends over the part of the pocket forwardly projecting beyond the bumper.

In a bumper with two bar or rail members, the pocket can be inserted between the two bars or rails and can be rigidly connected with the walls disposed nearest thereto, for example, by welding.

It is then appropriate to mount on the front side of each bumper bar or rail a continuous rubber strip and to provide the parts of the pocket projecting over the bumper in the forward direction with a rubber cover.

While the various embodiments of a bumper according to this invention so far described permit the force introduction in case of a lateral impact without harmful effects on the shock absorbers, it has been found additionally that in case of forces engaging extraordinarily eccentrically and extending in the vehicle longitudinal direction, the inclination of the bumper necessary for the unimpaired, unobstructed retraction of the shock absorber cannot always be fully achieved by the arrangement of the elastomer blocks so far described.

Accordingly, an additional aim of the present invention is to eliminate these last-mentioned disadvantages and to so constitute the coordination and/or cooperation of bumper and elastomer blocks that an unimpaired retraction of the shock absorbers can take place in all conceivable impart situations. Additionally, the vibrational behavior of the bumper is to be reduced thereby.

Consequently, it is additionally proposed with a bumper of the aforementioned type that according to the present invention the connection of the shaft or stem of each shock absorber with the associated elastomer blocks takes place under interconnection of a rigidly secured shell-like intermediate member which is anchored in the elastomer blocks by two vertically extending, mutually opposite extensions.

In case of an inclination of the bumper an energy absorption can take place if the extensions do not possess a round cross section. A force flow results therefrom by way of the extensions to the elastomer blocks.

The same effect can also be achieved with extensions having a round cross section by rigidly connecting the extensions with the elastomer blocks, for example, by bonding or gluing.

A towing-away or a starting by towing of the vehicle by the attachment of the towing equipment at the bumper is made possible without harmful reaction on the shock absorbers if the elastomer blocks abut with their front face at a wall rigidly connected with the bumper and are retained by a cover under production of a prestress.

In one advantageous embodiment of the present invention each elastomer insert can be embedded between two webs disposed one above the other and extending parallel to one another which preferably consist of the material of the bumper and are formed out of the latter.

It is of particular advantage if the front end face of each elastomer insert has a distance or spacing from the bumper which permits pivotal movements about the center longitudinal axis of the extensions. In case of an eccentric force engagement, the shock absorbers can then retract unimpairedly while producing the inherent damping action.

Accordingly, it is an object of the present invention to provide a bumper for motor vehicles, especially passenger motor vehicles, which avoids by simple means the aforementioned shortcomings and drawbacks encountered in the prior art.

Another object of the present invention resides in a bumper for motor vehicles which is able to absorb laterally impinging impacts as well as larger impacts in the vehicle longitudinal direction without damaging the bumper mounting or supporting parts of the body.

A further object of the present invention resides in a bumper for motor vehicles which includes transmission and mounting elements that permit also subsequent change-over and installation by simple means.

A still further object of the present invention resides in a bumper for motor vehicles which permits a particularly favorable force introduction and enables the attainment of a structural unit that can be assembled in a simple manner.

Another object of the present invention resides in a bumper for motor vehicles, especially passenger motor vehicles, which permits a towing of the vehicle without harmful effects on the shock absorbers.

A further object of the present invention resides in a bumper for motor vehicles which permits an unimpaired retraction of the shock absorber in case of any conceivable impact situation.

Still a further object of the present invention resides in a bumper of the type described above which reduces the vibrational behavior of the bumper and which permits an energy absorption in case of an inclination of the bumper.

These and other objects, features and advantages of the present invention will become more apparent from the following description when taken in connection with the accompanying drawing which shows, for purposes of illustration only, several embodiments in accordance with the present invention, and wherein.

Figure 1:
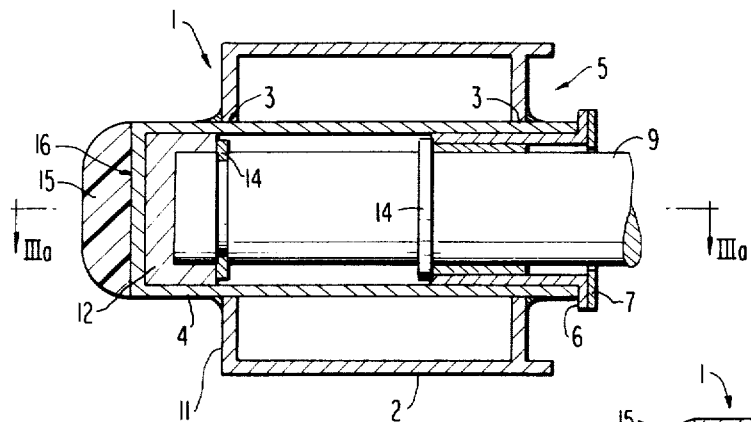
FIG. 1 is a cross-sectional view through a bumper in accordance with the present invention having only a single bumper bar and a pocket inserted into the single bumper bar.

Referring now to the drawing wherein like reference numerals are used throughout the various views to designate like parts, and more particularly to FIG. 1, the bumper generally designated by reference numeral 1 which is illustrated in this figure, includes one single bumper rail 2 or bar in which is provided an aperture 3. A pocket 4 is inserted into the aperture 3 from the backside 5 of the bumper 1 and is welded together with the same. As can be seen in particular from FIG. 3a, the pocket 4 receives a frame 6 having a bottom 7 which is provided with an aperture 8, through which is extended the shaft or stem 9 of a shock absorber 10 (of conventional construction and therefore not shown in detail) so as to be pivotal in the vehicle cross direction. An elastomer insert 12 surrounding the end of the shaft 9 within the area of the front side 11 of the bumper 1 supports itself as do also two elastomer blocks 13 extending in the vehicle cross direction and connected with the frame 6, at collars 14 which may be formed, for example, by shaft rings. A rubber strip 15 which extends over the portion 16 of the pocket 4 projecting forwardly beyond the bumper 1, protects the bumper 1 against damages.

Figure 2:
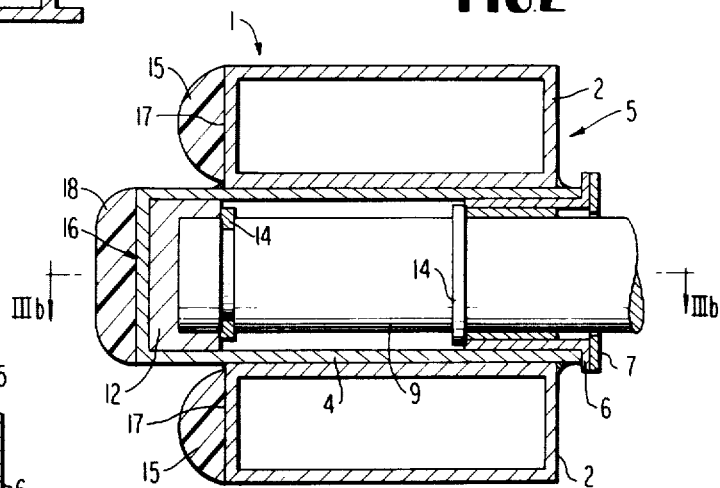
FIG. 2 is a cross-sectional view through a modified embodiment of a bumper in accordance with the present invention in which a pocket is secured between the two bars of the bumper.
Figure 3A:
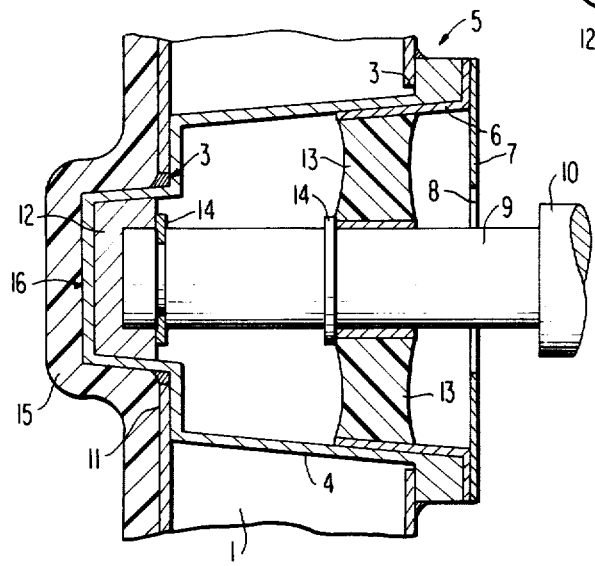
FIG. 3a is a cross-sectional view taken along line III—III of FIG. 1.
Figure 3B:
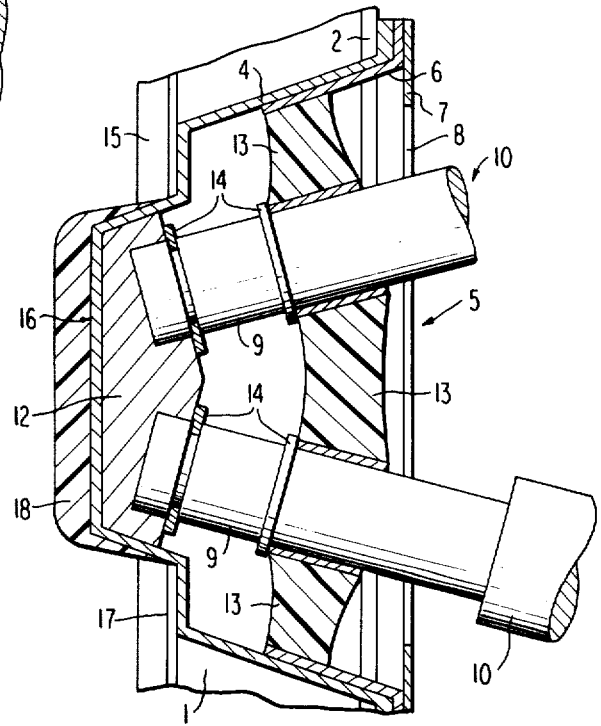
FIG. 3b is a cross-sectional view taken along line III—III of FIG. 2.

The embodiment according to FIGS. 2 and 3b does not significantly differ in construction from the embodiment already described in connection with FIGS. 1 and 3a so that similar parts are again designated by similar reference numerals. Differing from the embodiment of FIGS. 1 and 3a, the bumper of FIGS. 2 and 3b generally designated by reference numeral 1 includes two bumper bars or rails 2 disposed one above the other at a distance (FIG. 2) so that the pocket 4 can be inserted without preliminary work or machining. For purposes of a better force introduction, the shock absorbers 10 are provided pair-wise which are disposed in a horizontal plane and extend at an acute angle to one another (FIG. 3b) in the direction of the bumper 1; these shock absorbers 10 are thereby connected with each other by an additional elastomer block 13. Two rubber strips 15 extend along the front faces 17 of the bars or rails 2. The portion 16 of the pocket 4 projecting forwardly beyond the bumper 1 is also covered in each case by a respective rubber covering 18.

As a result of the series-connection of the elastomer inserts 12 and of the elastomer blocks 13, on the one hand, and of the shock absorbers 10, on the other, slight impacts in the vehicle longitudinal direction are absorbed by the elastomer elements which also prevent a transmission of vibrations or oscillations of the bumper 1 to the vehicle body. Heavy impacts are absorbed as heretofore by the series-connected shock absorbers 10 after the elastomer inserts 12 have been compressed into blocking.

In case of a lateral impact the force component extending in the vehicle transverse direction is absorbed by the elastomer elements 13 whereas the component extending in the vehicle longitudinal direction is introduced as already described.

Figure 4:
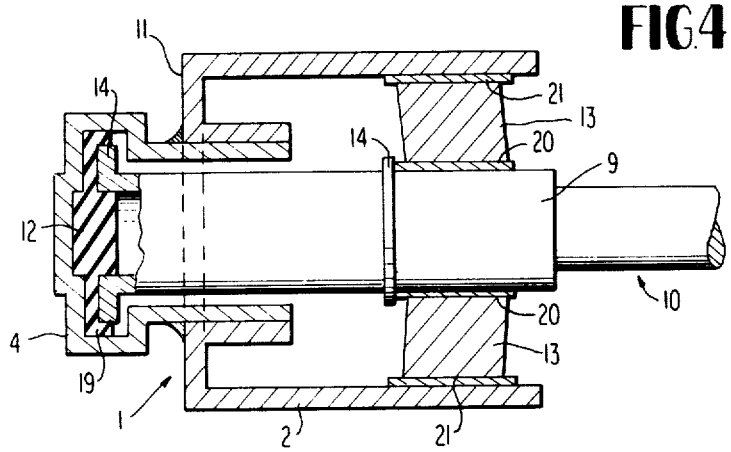
FIG. 4 is a longitudinal cross-sectional view through a further embodiment of the arrangement of elastomer-metal elements in a bumper according to the present invention.
Figure 5:
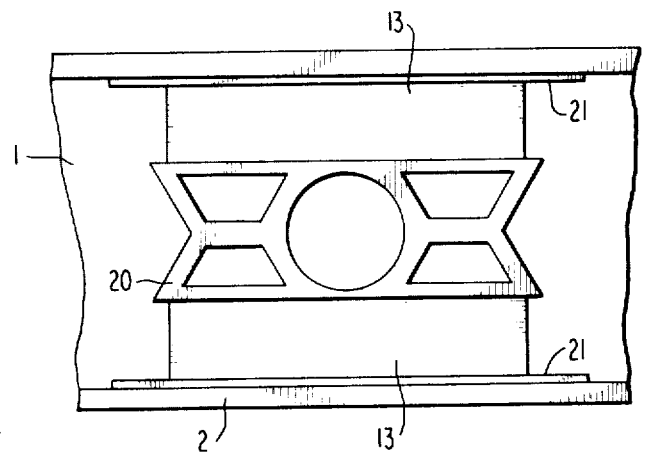
FIG. 5 is a rear elevational view of the arrangement according to FIG. 4 without shock absorber.

A further embodiment of the present invention is illustrated in FIGS. 4 and 5. Contrary to the bumper arrangement described so far the pocket 4 receives in this case only the elastomer inserts 12 whereas the elastomer blocks 13, on the one hand, are connected with each other by a metal member 20 and, on the other, are enclosed on the outside by metal plates 21 which are detachably connected with the bumper 1 as schematically indicated in FIG. 5. Furthermore, the forward collar 14 is flattened off at its circumference so that in conjunction with the pocket 4 having a rectangular or oval cross section, a bayonet-connection-like arrangement 19 results. For the installation of the shock absorber 10 the latter is inserted rotated by 90° opposite the position illustrated in FIG. 4 in order to be fixed thereafter by renewed rotation through 90° upon abutment of the front collar 14 on the elastomer insert 12. The illustrated support position of the collar 14 is achieved in that the elastomer blocks 13 are each installed under prestress.

A vehicle equipped with such a bumper arrangement can be readily towed away by attaching the towing equipment at the bumper 1 without having to fear harmful reactions on the elastomer-metal elements and on the shock absorbers 10. The starting jerk is damped by the prestress of the elastomer blocks 13, and due to the abutment of the forward collar 14 at the pocket 4 the towing force is introduced without a further stressing of the elastomer blocks 13 by way of the shock absorbers 10.

Figure 6:
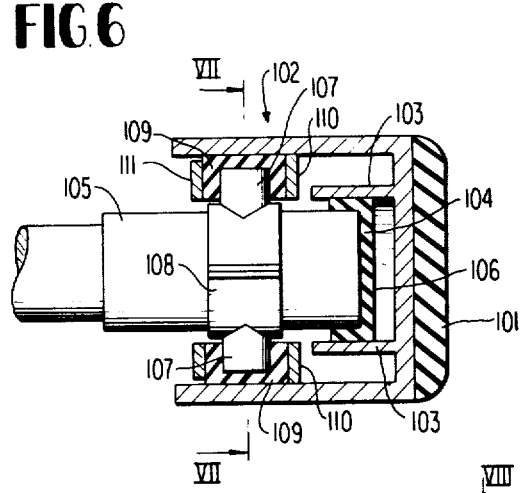
FIG. 6 is a cross-sectional view through a further embodiment of a bumper within the area of a shock absorber arranged in accordance with the present invention.
Figure 7:
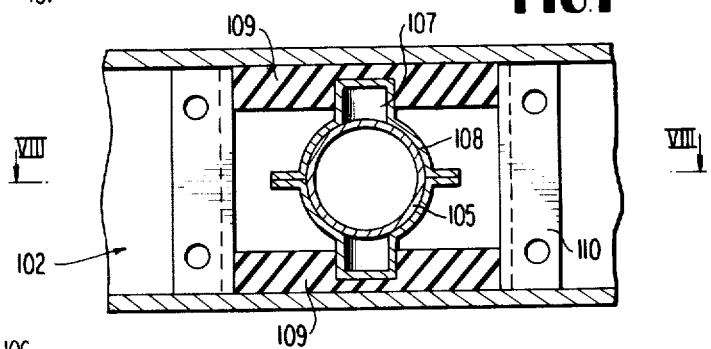
FIG. 7 is a cross-sectional view taken along line VII—VII of FIG. 6.
Figure 8:
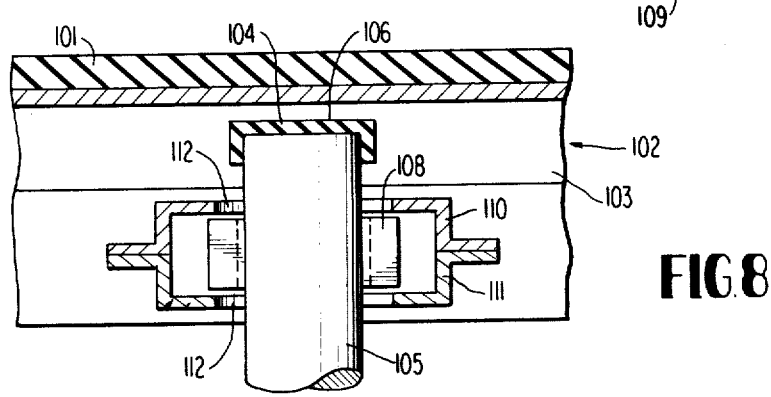
FIG. 8 is a cross-sectional view taken along line VIII—VIII of FIG. 7.

In the embodiment illustrated in FIGS. 6–8, the bumper generally designated by reference numeral 102 is protected by a rubber strip 101; which bumper 102 consists, for example, of an extruded profile, and includes two webs 103 extending approximately parallel to one another in the vehicle transverse direction, between which are arranged elastomer inserts 104. The latter accommodate, respectively, one end of a shock absorber 105 within the area of the front side of the bumper 102. The front end faces 106 of the elastomer inserts 104 have a spacing which enable pivotal movements about the center longitudinal axes of extensions 107. A secure anchoring in elastomer blocks 109, brought about in case of a round cross section of the extensions 107, for example, by gluing or bonding, takes place by means of these extensions 107, which are formed out of a shell-like intermediate member 108. However, the anchoring can also be achieved in that the extensions 107 have a non-round cross section.

The elastomer blocks 109 abut with their front faces at a wall 110 rigidly connected with the bumper 102 and are pressed against the wall 110 by a cover 111 while producing a prestress. In order that an unimpaired inclination of the bumper 102 can take place in case of an impact eccentrically impinging on the bumper 102, the wall 110 and cover 111 are provided with sufficiently large apertures 112 (FIG. 8) for the passage therethrough of the shock absorber 105. During this inclination a return moment is produced due to the deformation of the elastomer blocks 109 which contributes to the return of the bumper 102 into its original position after termination of the impact.

While we have shown and described several embodiments in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. A bumper for motor vehicles which is connected with a relatively fixed support structure by interposition of elastomer-metal elements, characterized in that in the sense of a series connection between the bumper and said support structure, there are provided therebetween shock absorber means, on the one hand, and elastomer block means supporting the bumper in the vehicle transverse direction as well as elastomer insert means receiving an end of the shock absorber means within the area of the forward side of the bumper, on the other hand, each shock absorber means including a shaft portion, the connection of the shaft portion of each shock absorber means with the associated elastomer block means taking place under interposition of a rigidly secured shell-like intermediate member anchored in the elastomer block means by two mutually oppositely disposed extensions.

2. A bumper according to claim 1, characterized in that said extensions extend substantially vertically.

3. A bumper according to claim 2, characterized in that the extensions have a cross section other than a round cross section.

4. A bumper according to claim 3, characterized in that the elastomer block means abut with their front faces at a wall rigidly connected with the bumper and are retained by a cover under production of a prestress.

5. A bumper according to claim 4, characterized in that each elastomer insert means is embedded between two web means disposed one above the other and extending substantially parallel to one another.

6. A bumper according to claim 5, characterized in that the web means consist of the material of said bumper.

7. A bumper according to claim 5, characterized in that the end face of each elastomer insert means has a spacing from the bumper which enables pivotal movements about the center longitudinal axes of the extensions.

8. A bumper according to claim 1, characterized in that the elastomer block means abut with their front faces at a wall rigidly connected with the bumper and are retained by a cover under production of a prestress.

9. A bumper according to claim 1, characterized in that each elastomer insert means is embedded between two web means disposed one above the other and extending substantially parallel to one another.

10. A bumper according to claim 9, characterized in that the web means consist of the material of said bumper.

11. A bumper according to claim 1, characterized in that the end face of each elastomer insert means has a spacing from the bumper which enables pivotal movements about the center longitudinal axes of the extensions.

12. A bumper system comprising generally U-shaped bumper means, at least one shock absorber means extending from said bumper means in a given direction, and interconnecting means elastically interconnecting said bumper means and shock absorber means, said interconnecting means comprising transverse elastic support means supporting said bumper means in a direction transverse to the direction in which said at least one shock absorber means extends and longitudinal elastic support means supporting said bumper means in a direction longitudinal to the direction in which said at least one shock absorber means extends, wherein said generally U-shaped bumper means houses both said transverse and longitudinal elastic support means.

13. A bumper system according to claim 12, wherein said elastic support means are elastomers, and wherein said bumper system is connected to a vehicle fixed support structure.

14. A bumper system according to claim 13, wherein said shock absorber means include two substantially horizontally extending shock absorbers, which shock absorbers extend with respect to one another at an acute angle in the direction of the bumper means, and wherein said two shock absorbers are interconnected by elastomer means.

15. A bumper system according to claim 14, wherein the elastomer means interconnecting said two shock absorbers are surrounded by a frame means having a bottom and are inserted into a pocket means, and wherein an aperture means is provided in said bottom, each of said respective shock absorbers having a shaft extending through said aperture means in such a manner as to be pivotal in said transverse direction.

16. A bumper system according to claim 13, wherein said transverse elastic support means are surrounded by a pocket means which is inserted into said bumper means and which is rigidly connected with said bumper means.

17. A bumper system according to claim 16, wherein the pocket means has a substantially rectangular cross section.

18. A bumper system according to claim 16, wherein the pocket means has a substantially oval cross section.

19. A bumper system according to claim 16, wherein the pocket means is rigidly connected with the bumper by welding.

20. A bumper system according to claim 16, wherein said shock absorber means includes a shock absorber shaft, and wherein the free end of said shock absorber shaft is connected by a bayonet-connectionlike means to said longitudinal elastic support means.

21. A bumper system according to claim 16, wherein the transverse elastic support means includes a plurality of transverse elastic support elements which are connected with each other by a metallic part means and which are enclosed on the outside thereof by metallic plate means, said metallic plate means being detachably connected with said bumper means.

22. A bumper system according to claim 21, characterized in that the metallic part means is made in one piece.

23. A bumper system according to claim 21, characterized in that the metallic part means is of multipartite construction.

24. A bumper system according to claim 21, wherein the metallic plate means are detachably connected with said bumper means under production of a prestress produced by the transverse elastic support means.

25. A bumper system according to claim 21, wherein said shock absorber means is provided with a shaft with two collars, which collars support the associated transverse elastic support means and the associated longitudinal elastic means.

26. A bumper system according to claim 25, wherein the bumper means comprises a single rail-like bumper bar with a large aperture provided therein and said pocket means is inserted into said aperture and is rigidly connected with walls of the bumper bar disposed closest to said pocket means.

27. A bumper system according to claim 26, wherein the pocket means is welded to walls of the bumper bar.

28. A bumper system according to claim 26, wherein said pocket means project forwardly beyond said bumper means and a front side of the bumper bar is provided with a rubber strip which extends over a part of said pocket means projecting forwardly beyond said bumper means.

29. A bumper system according to claim 26, wherein the bumper means comprise two rail-like bumpers bars and the pocket means is inserted between the two bumper bars and is rigidly connected with walls of said bumper bars disposed nearest to said pocket means.

30. A bumper system according to claim 29, wherein the pocket means is connected with said walls by welding.

31. A bumper system according to claim 29, wherein said pocket means projects forwardly beyond said bumper bars, a continuous uninterrupted rubber strip being carried at the front face of each of said bumper bars, and wherein the portions of said pocket means projecting forwardly beyond said bumper bars are provided with an elastic cover means.

32. A bumper system according to claim 31, wherein said shock absorber means includes a shock absorber shaft, and wherein the free end of said shock absorber shaft is connected by a bayonet-connectionlike means to said longitudinal elastic support means.

33. A bumper system according to claim 16, wherein the bumper means comprises a single rail-like bumper bar with a large aperture provided therein and said pocket means is inserted into said aperture and is rigidly connected with walls of the bumper bar disposed closest to said pocket means.

34. A bumper system according to claim 33, wherein said pocket means projects beyond a front of said bumper means which front is provided with a rubber strip which extends over a part of said pocket means projecting forwardly beyond said bumper means.

35. A bumper system according to claim 16, wherein the bumper means comprises two rail-like bumper bars and the pocket means is inserted between the two bumper bars and is rigidly connected with walls of said bumper bars disposed nearest to said pocket means.

36. A bumper according to claim 35, wherein a continuous uninterrupted rubber strip is mounted at a front face of each bumper bar, and wherein portions of said pocket means project forwardly beyond said bumper means which portions are provided with an elastic cover means.

37. A bumper system according to claim 16, wherein said shock absorber means include two substantially horizontally extending shock absorbers which extend with respect to one another at an acute angle in the direction of said bumper means, and wherein elastomer block means interconnect said two shock absorbers.

38. A bumper system according to claim 16, wherein a frame means having a bottom containing an aperture surrounds said transverse elastic support means, said frame means being inserted into said pocket means, and wherein shaft means are provided for said shock absorber means, said shaft means extending through said aperture in such a manner as to be pivotal in said transverse direction.

39. A bumper system according to claim 16, wherein said pocket means is inserted into said bumper means from a front side thereof.

40. A bumper system according to claim 16, wherein said self-contained structural unit comprises a rigid unitary housing which is fixedly attached to one of said bumper means and said vehicle fixed support structure.

41. A bumper system accordinng to claim 13, wherein a frame means having a bottom with aperture means therein surrounds said transverse elastic support means, said transverse elastic support means and said frame means being inserted into a pocket means, and wherein a shaft means is provided for said shock absorber means, said shaft means extending through said aperture means in such a manner as to be pivotal in said transverse direction.

42. A bumper system according to claim 13, wherein said shock absorber means is provided with a shaft with two collars, which collars support the associated transverse elastic support means and the associated longitudinal elastic support means.

43. A bumper system comprising bumper means, at least one shock absorber means extending from said bumper means in a given direction, interconnecting means elastically interconnecting said bumper means and shock absorber means, said interconnecting means comprising transverse elastic support means supporting said bumper means in a direction transverse to the direction in which said at least one shock absorber means extends and longitudinal elastic support means supporting said bumper means in a direction longitudinal to the direction in which said at least one shock absorber extends, and a self-contained structural housing unit housing both said transverse and longitudinal support means, wherein said elastic support means are elastomers, wherein said bumper system is connected to a vehicle fixed support structure, and wherein said shock absorber means includes a shaft portion, a connection of said shaft portion with said transverse elastic support means taking place under interposition of a rigidly secured shell-like intermediate member anchored in said elastomer means of said transverse elastic support means by two mutually oppositely disposed extensions.

44. A bumper according to claim 43, wherein the shell-like intermediate member is a collar on said shaft portion and wherein said extensions are embedded in said elastomer means of said transverse elastic support means.

45. A bumper according to claim 44, wherein said extensions extend substantially vertically.

46. A bumper according to claim 45, wherein said extensions have a non-circular cross section.

47. A bumper according to claim 43, wherein said extensions extend substantially vertically.

48. A bumper system comprising bumper means, shock absorber means, and interconnecting means elastically interconnecting said bumper means and said shock absorber means, said interconnecting means comprising transverse elastic support means supporting said bumper means in a direction transverse to the direction in which said shock absorber means extend and longitudinal elastic support means supporting said bumper means in a direction longitudinal to the direction in which said shock absorber means extend, said shock absorber means being interconnected with said transsverse elastic support means by two elements extending from said shock absorber means, said elements being anchored in said transverse elastic support means.

49. A bumper system according to claim 48, wherein a rigid shell-like means is provided for said shock absorber means, said elements being connected to said shell-like means.

50. A bumper system according to claim 48, wherein said elements extend substantially vertically when positioned on a vehicle, and are mutually oppositely disposed about the shock absorber means.

51. A bumper system according to claim 50, wherein said elastic support means are formed of elastomers.

52. A bumper system according to claim 48, wherein said transverse elastic support means abut with front faces thereof at a wall rigidly connected with said bumper means and are retained by a cover under production of a prestress.

53. A bumper system according to claim 52, wherein each of said longitudinal elastic support means is embedded between two web means disposed one above the other and extending substantially parallel to one another.

54. A bumper system according to claim 53, wherein the web means consist of the material of said bumper means.

55. A bumper system according to claim 53, wherein each of said longitudinal elastic support means has an end face which supports said bumper means in said longitudinal direction, said end face being spaced from said bumper means in such a manner as to enable pivotal movement about the center longitudinal axes of said elements.

56. A bumper system according to claim 48, wherein each of said longitudinal elastic support means is embedded between two web means disposed one above the other and extending substantially parallel to one another.

57. A bumper system according to claim 56, wherein said web means consists of the material of said bumper means.

58. A bumper system according to claim 48, wherein said longitudinal elastic support means includes an end face which is spaced from said bumper means in such a manner as to enable pivotal movement about the center longitudinal axes of said elements.

59. A bumper system according to claim 1, wherein retaining means are provided for retaining said interconnecting means in a prestressed condition.

60. A bumper system according to claim 59, wherein said prestressed interconnecting means are prestressed in such a manner as to produce a damping effect on shock forces applied to said shock absorber means through said bumper means.

* * * * *